Patented May 12, 1936

2,040,626

UNITED STATES PATENT OFFICE 2,040,626

AMINOBUTANE-DISULPHONIC ACIDS AND ALKYL-SUBSTITUTION PRODUCTS THEREOF AND A PROCESS OF PREPARING THEM

Otto Nicodemus and Walter Schmidt, Frankfort-on-the-Main-Hochst, Germany, assignors to General Aniline Works, Inc., New York, N. Y., a corporation of Delaware No Drawing. Application September 15, 1934, Serial No. 744,262. In Germany September 20, 1933

7 Claims. (Cl. 260—127)

The present invention relates to aminobutane-disulphonic acids and alkyl-substitution products thereof and to a process of preparing them, more particularly it relates to new compounds of the general formula:

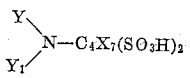

wherein X, Y, and $Y_1$ stand for hydrogen or for alkyl radicals.

The said new compounds are obtainable by causing ammonia or a primary or secondary aliphatic amine, such as methylamine, ethylamine butylamine, propylamine, dimethylamine, diethylamine or any other alkyl- and dialkylamine, which compounds may be represented by the general formula:

wherein Y and $Y_1$ stand for hydrogen or alkyl radicals to react with a butene-disulphonic acid, which may be substituted by alkyl, or with a salt thereof.

The reaction is advantageously carried out by treating together an alkali metal salt of the butane-disulphonic acid and the amine or ammonia at a temperature between about 100° C. and about 300° C. in an autoclave under pressure, say under a pressure of about 10 to 50 atmospheres.

The butene-disulphonic acids used as starting materials in the present process are obtainable, for instance, by the addition of halogen to butadiene, alkyl-substituted butadienes, divinylacetylene and other suitable compounds and replacing the halogen atoms in the thus formed dihalogenbutene compounds by sulphonic acid groups. As starting materials there may be mentioned, for instance, butene-(2)-disulphonic acid-(1,4), butene-(1)-disulphonic acid-(3,4), butene-(1)-methyl-(2)-disulphonic acid-(3,4), butene-(2)-dimethyl-(1,4)-disulphonic acid-(3,4), butene-(2)-dimethyl-(1,4)-disulphonic acid-(1,4) and other alkylated butene-(1)- and butene-(2)-disulphonic acids.

The hitherto unknown amino- and mono- and dialkyl-aminobutane-disulphonic acids and the corresponding C-alkyl derivatives which are thus obtainable with a good yield possess an acid character and are readily soluble in water. They may be used with advantage as assistants for the textile industry and for pharmaceutical purposes. They represent valuable starting materials and intermediates for the preparation of other compounds.

The new compounds may be obtained in the form of the alkali metal salts; free acids are formed and may be separated by treating the alkali metal salts with concentrated hydrochlorid acid.

The following examples serve to illustrate the invention but they are not intended to limit it thereto, the parts being by weight:

(1) 260 parts of the sodium salt of butene-(2)-disulphonic acid-(1,4) of the formula:

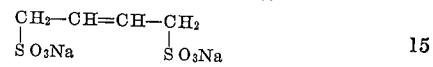

or the corresponding quantity of the potassium salt are heated in an autoclave together with 1000 parts of an aqueous methylamine solution of 40% strength for 5 hours at 180° C.–185° C. under a pressure of 30–32 atmospheres above atmospheric pressure. After the methylamine has been expelled, there remain 233 parts of the sodium salt of methylaminobutane-(2)-disulphonic acid-(1,4) of the formula:

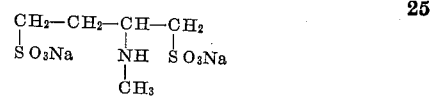

in a solution of 22% strength. The yield obtained corresponds with 80% of that of the theory. The free disulphonic acid may be separated by treating the solution of the disodium salt with concentrated hydrochloric acid.

The corresponding ethylaminobutane disulphonic acid compound is obtainable by using ethylamine instead of methylamine.

(2) 165 parts of the sodium salt of butene-(1)-disulphonic acid-(3,4) of the formula:

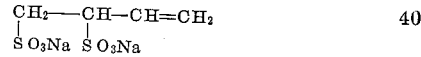

of 80% strength are heated together with 500 parts of methylamine of 40% strength for 3 hours in an autoclave provided with a stirrer at 175° C–180° C. under a pressure of 28–30 atmospheres above atmospheric pressure. When the solution is freed from the methylamine it contains 128 parts of the sodium salt of methylaminobutane-(1)-disulphonic acid-(3,4) of the formula:

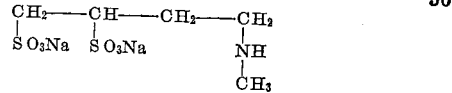

which corresponds with 88% of the theoretical amount. The free disulphonic acid may be separated by treating the solution of the disodium salt with concentrated hydrochloric acid.

The corresponding ethylaminobutane disulphonic acid compound is obtainable by using ethylamine instead of methylamine.

(3) 1 mol. of the sodium salt of butene-(1)-disulphonic acid-(3,4) is heated with 6 mols of ammonia in an aqueous solution of 25% strength for 3 hours in an autoclave at 180° C. After the usual working up there is obtained with a good yield the sodium salt of aminobutane-(1)-disulphonic acid-(3,4) of the formula:

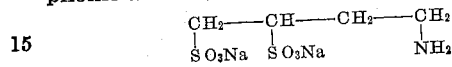

We claim:

1. The process which comprises heating in an autoclave a compound of the group consisting of alkali metal salts of butene-disulphonic acids and alkyl substitution products thereof together with a compound of the general formula:

wherein Y and $Y_1$ stand for hydrogen or alkyl radicals at a temperature between about 100° C. and about 300° C. and under a pressure of about 10 to about 50 atmospheres.

2. The process which comprises heating in an autoclave the sodium salt of butene-(1)-disulphonic acid-(3,4) with methylamine at a temperature of about 175° C. to 180° C. and under a pressure of about 28 to 30 atmospheres.

3. The process which comprises heating in an autoclave the sodium salt of butene-(2)-disulphonic acid-(1.4) with methylamine at a temperature of about 180° C. to 185° C. and under a pressure of about 30 to 32 atmospheres.

4. The compounds of the general formula:

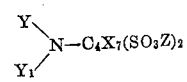

wherein two X's stand for hydrogen or alkyl, the other X's stand for hydrogen and Y and $Y_1$ represent hydrogen or alkyl radicals and Z stands for hydrogen or an alkali metal atom.

5. The compound of the formula:

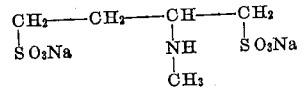

6. The compound of the formula:

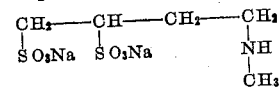

7. The compound of the formula:

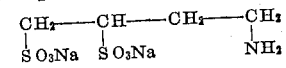

OTTO NICODEMUS.
WALTER SCHMIDT.